Feb. 23, 1971          F. BAUGNIES ET AL          3,564,652
              PLASTIC ARTICLE FABRICATION DEVICE
Filed May 9, 1967                              3 Sheets-Sheet 1

INVENTORS.
Francis Baugnies
Michel Lorge

BY Spencer & Kays
ATTORNEYS.

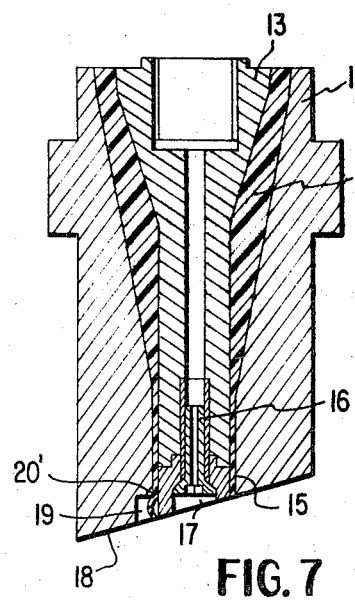
FIG. 7
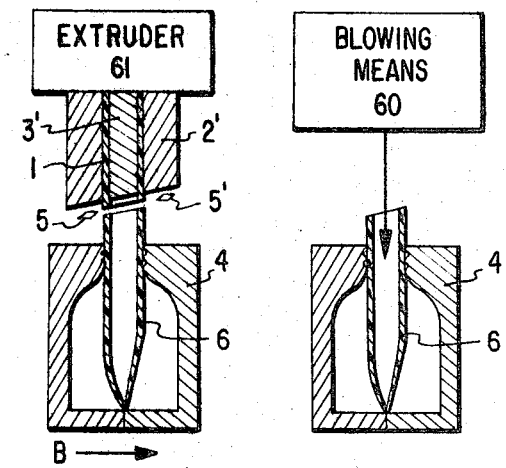
FIG. 8
FIG. 8a
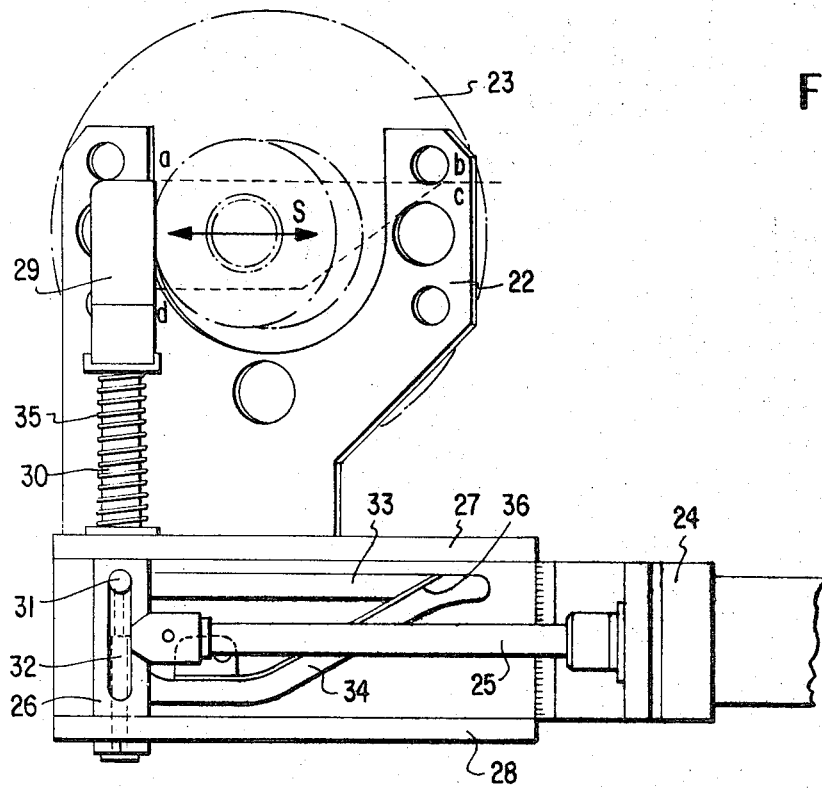
FIG. 9

Feb. 23, 1971   F. BAUGNIES ET AL   3,564,652
PLASTIC ARTICLE FABRICATION DEVICE
Filed May 9, 1967   3 Sheets-Sheet 3

INVENTORS.
Francis Baugnies
Michel Lorge

BY *Spencer & Kaye*

ATTORNEYS.

United States Patent Office 3,564,652
Patented Feb. 23, 1971

3,564,652
PLASTIC ARTICLE FABRICATION DEVICE
Francis Baugnies, Brussels, and Michel Lorge, Berchem-Sainte-Agathe, Belgium, assignors to Solvay & Cie, Brussels, Belgium
Filed May 9, 1967, Ser. No. 637,165
Claims priority, application Belgium, May 10, 1966, 27,883; Dec. 7, 1966, 36,852
Int. Cl. B29d 23/04
U.S. Cl. 18—14        7 Claims

ABSTRACT OF THE DISCLOSURE

An arrangement for extruding a straight hollow tube and for cutting the tube into parisons along a plane oblique to the longitudinal tube axis, the extrusion head having an internal mandrel whose end face lies in an oblique plane parallel to the cutting plane, and an external die whose tube contacting surface terminates in a plane perpendicular to the longitudinal axis of the head.

BACKGROUND OF THE INVENTION

The present invention relates to an extrusion head for the production of tubular plastic parisons, and particularly to an extrusion head adapted to be attached to an extruder arranged to feed a machine for the continuous molding of hollow articles by blow molding.

In most molding machines of the above-mentioned type, a continuous plastic tube is extruded and successive portions are introduced into successive movable blow molds, with each successive tube portion being cut off from the tube to form an individual parison after it has been inserted into its respective blow mold. The term "parison," which has been borrowed from the glass manufacturing art, refers to a plastic body which has been given a preliminary tubular shape and which is to be given it final shape, such as that of a bottle for example, in its associated blow mold. After a parison is cut off from the remaining portion of the tube, its associated blow mold is transported away from the extruder in a plane substantially perpendicular to the axis of the extrusion orifice, the blow mold following a linear or curvilinear path.

One form of prior art apparatus of this type is shown in the simplified cross-sectional views of FIGS. 1 and 2, which illustrate two stages of the process. The apparatus includes an extrusion head constituted by a die 2 and a mandrel, or core, 3 for forming a continuous hollow plastic tube 1 from which the parisons 6 are to be cut. Each successive portion of the tube 1 is introduced into, and gripped by, a successive mold 4 traveling along a path in the direction indicated by arrow B. As each tube portion is introduced into a respective mold, the portion is cut off from the remainder of the tube by a knife, or blade, 5.

One of the major drawbacks associated with this type of apparatus results from the fact that the extruder delivers the hollow tube from which the parisons are cut in a continuous manner in the direction indicated by the arrow A. Since the tube being formed continues to be extruded in the direction of the arrow A as the mold 4 moves in the direction of the arrow B, the danger arises that, as the mold moves in the direction of the arrow B, the tube portion being delivered by the extruder will move into contact with the cut end of the parison 6 and the severed tube portions will become reattached. This is shown at 7 in FIG. 2 which shows the relative positions of the elements a short time after they occupied the positions shown in FIG. 1. The reattachment of the tube portions is possible because the palstic material of the tube 1 is heated during the extrusion process and remains heated for some time thereafter.

It has already been suggested to overcome this drawback by employing an extruder whose head is movable in a vertical direction so that it can be withdrawn after the cutting off of a parison. However, this solution requires the use of a special extruder and of a costly and delicate mechanism. In addition, such a technique would pose serious problems with respect to the centering of the parisons in the case where pivoting extruders are employed.

SUMMARY OF THE INVENTION

It is therefore a primary object of the present invention to eliminate the above-mentioned drawbacks and difficulties.

Another object of the present invention is to prevent any contact between the cut parison and the remaining portion of the tube without requiring any movement of the extrusion head.

Yet another object of the present invention is to cut off each parison in such a manner as to render impossible any subsequent contact between the parison and the tube portion emerging from the extrusion head.

Applicants have discovered that it is possible to avoid the above-noted drawbacks and difficulties by cutting off each parison, after it has been introduced into its associated mold, along a plane which is oblique to the longitudinal axis of the parison, the highest point of the cut, i.e., the point nearest the extrusion head and furthest from the blow mold, being situated at the side of the tube which is in the direction of movement of the mold with respect to the extrusion head.

In order to effecuate this particular cutting operation, applicants have devised a novel extrusion head which can be adapted for use on any known type of extruder.

These and other objects according to the present invention are achieved, in a device for extruding a straight hollow tube and for cutting the tube into parisons along a plane oblique to the longitudinal tube axis, which device includes an extrusion head, by certain modifications of the extrusion head. According to these modifications, the extrusion head includes an internal mandrel whose end face lies in a plane oblique to the longitudinal axis of the head and parallel to the plane along which the tube is to be cut, and an external die disposed around the mandrel and defining a tube-forming channel therewith, that die surface which defines the outer boundary of this channel terminating at a plane perpendicular to the longitudinal axis of the head.

According to a preferred embodiment of the present invention, the end face of the die lies in an oblique plane parallel to the plane along which the tube is to be cut, the end face being provided, in the region adjacent the outlet end of the channel between the die and the mandrel, with a recess terminated by a surface lying in the plane perpendicular to the longitudinal axis of the head.

BRIEF DESCRIPTION OF THE DRAWINGS

FIG. 7 is an elevational cross-sectional view of a preferred embodiment of the present invention.

FIG. 8 is a view similar to that of FIG. 1 illustrating the cutting operation according to the present invention.

FIG. 8a is an analytical representation of a part of FIG. 8.

FIG. 9 is a bottom plan view of a cutter control device according to the present invention.

DESCRIPTION OF THE PREFERRED EMBODIMENTS

Figure 1:
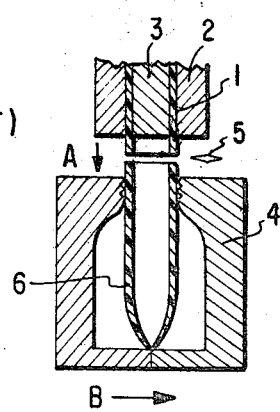
FIG. 1 is a simplified, cross-sectional, elevational view showing an extrusion head-mold arrangement according to the prior art at the instant when a tube section is cut off.
Figure 2:
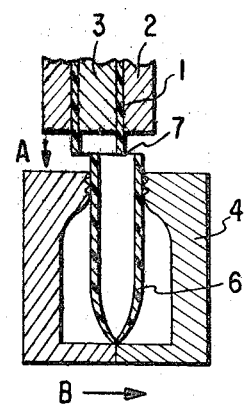
FIG. 2 is a view similar to that of FIG. 1 at a succeeding instant.

FIGS. 1 and 2 have already been described in detail above.

Figure 3:
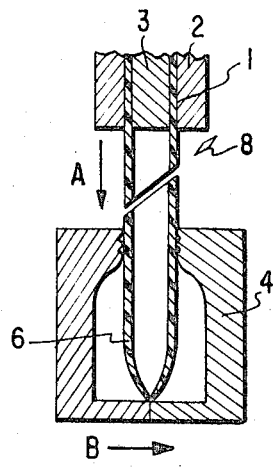
FIG. 3 is a view similar to that of FIG. 1 illustrating the type of cutting employed in the present invention.
Figure 4:
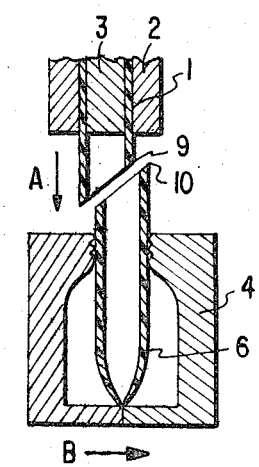
FIG. 4 is a view similar to that of FIG. 2 showing the arrangement of FIG. 3 at a succeeding instant.

FIGS. 3 and 4 illustrate an arrangement similar to that shown in FIGS. 1 and 2, with FIG. 3 showing an instant in the parison forming process corresponding to that of FIG. 1 and FIG. 4 showing an instant corresponding to that of FIG. 2. The apparatus shown in FIGS. 3 and 4 includes an extrusion head composed of a die 2 and a mandrel 3 producing a hollow plastic tube 1 and feeding the tube in the direction of the arrow A. There is also shown one blow mold 4 of a succession of such molds traveling in the direction of the arrow B, with each blow mold receiving one parison 6.

According to the present invention, each successive parison 6 is cut off from the remaining tube portion by a cutter 8 which moves so as to cut the tube along a plane oblique to the longitudinal axis of the tube 1, the cutting plane extending upwardly in the direction of travel B of the blow mold 4.

As is best shown in FIG. 4, a cut of this type causes the separation between the cut ends of parison 6 and the remaining tube portion 1 to remain a substantially constant distance apart as the mold 4 moves in the direction of arrow B, despite the continued descent of the following tube portion 1 in the direction of the arrow A. As a result, any danger of the descending tube portion 1 coming in contact with the cut end of parison 6 is eliminated.

Although a substantial improvement could thus be obtained simply by cutting off each successive parison in the manner described above, it has been found in practice that fully satisfactory results can not be obtained simply by modifying the cutting plane. This is true because with a device of the type shown in FIGS. 3 and 4 the tube must be cut at a point relatively distant from the end face of the extrusion head in order to permit the cutter to clear the extrusion head. As a result, the tube would not have adequate support in the cutting region and hence the cut ends of the tube and the parison would tend to be irregular.

This drawback can be overcome, according to another feature of the present invention, by constructing the extrusion head in such a manner as to permit the tube to be cut at a point close to the extrusion head end face.

Figure 5:
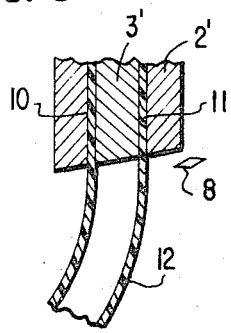
FIG. 5 is a simplified, cross-sectional view of an extrusion head illustrating the basic principles of the present invention.

It would be conceivable to accomplish this in the manner illustrated in FIG. 5 by employing an external die 2′ whose end face lies in an oblique plane parallel to the plane along which the tube is to be cut. This would, of course, permit the cutter 8 to be moved much closer to the end face of the extrusion head than would be possible in the arrangement shown in FIGS. 3 and 4, particularly if the end face of the mandrel 3′ of FIG. 5 were made coplanar with that of the die 2′.

However, it has been found that a die whose end face has the form shown in FIG. 5 possesses certain drawbacks which would create serious difficulties if the extrusion head were to be employed in a blow molding arrangement. Specifically, since the softened plastic material being extruded in the extrusion head would follow paths 10 and 11 of unequal lengths in traversing the die 2′, the pressures to which various portions of the tube are subjected would be distributed in a non-uniform manner around the circumference of the extrusion head. As a result, the tube 12 emerging from the extrusion head would have a tendency to assume an arcuate shape, as shown in FIG. 5, which would render a proper centering of the tube in the blow mold practically impossible.

Figure 6:
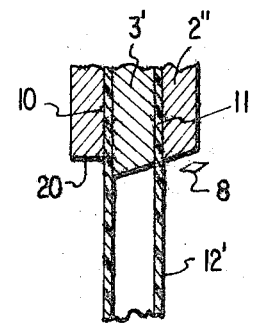
FIG. 6 is a view similar to that of FIG. 5 of an extrusion head according to the present invention.

This is overcome, according to another feature of the present invention, by giving the end face of the die the form shown for the element 2″ in FIG. 6. According to this form of construction, the inner longitudinal wall of die 2″, which wall is in contact with the plastic material during the extrusion operation and defines the outer boundary of the tube-forming channel, is terminated by a plane perpendicular to the extrusion head axis. This gives the end face of the die 2″ a surface 20 which extends perpendicular to the longitudinal axis of the extrusion head. As a result, the various portions 10, 11 of the tube 12′ will follow paths of equal length in traversing the die 2″ and the resulting tube 12″ will follow a straight path as it emerges from the extrusion head. This arrangement thus permits the drawbacks noted above to be eliminated while permitting the tube to be cut by the cutter 8 along a plane sufficiently close to the end of the extrusion head to assure that the tube will be adequately supported along the cutting plane, the mandrel 3′ having an oblique end face which permits it to impart the necessary support to the tube 12′.

FIG. 7 shows in a more detailed manner an extrusion head constituting a preferred embodiment of the present invention. This head basically includes a hollow internal mandrel, or core, 13, and a die 14. The end of the mandrel 13 is constituted by a piece 15 of the same diameter as the remainder of the mandrel and having an end face 17 lying in a plane oblique to the longitudinal axis of the extrusion head. The piece 15 is connected by means of a hollow screw 16 in a recess provided in the end of the main portion of mandrel 13.

The external die 14 has an end face 18 which also lies in a plane oblique to the longitudinal axis of the head and which is preferably coplanar with the end face 17 of piece 15. The plane defined by end faces 17 and 18 is parallel to the plane along which the extruded tube is to be cut.

The range over which the angle between the oblique cutting plane of the present invention and a plane perpendicular to the longitudinal axis of the head can vary is between 1 and 30° but an angle of 8 to 15° is preferred.

During the extrusion of the parison, a gas may be blown through the hollow longitudinal passage of the mandrel 13 in order to achieve a fine adjustment of the diameter of the extruded parison.

The end of die 14 is provided with a recess 19 terminated by a planar rear face 20′ which extends around the circumference of the die and which lies in a plane perpendicular to the axis of the head. Thus, the recess 19 and surface 20′ assure that the plastic material 21 traversing the tube-forming portion of the die will follow a path having the same length along every longitudinal line about the circumference of the extrusion head and that, as a result, the extruded plastic tube will be straight and uniform.

It should, of course, be appreciated that many modifications could be imparted to the embodiment of FIG. 7 without departing from the basic concept and spirit of the present invention. For example, the surface 20′ could be extended across the entire end face of the die 14 and could be cut along a plane perpendicular to the longitudinal axis of the head so that only the mandrel 14 presents a completely oblique end face. The mandrel 13 could be made of one piece. The end surface 20′ of the recess 19 could be shifted somewhat in the direction of the axis of the extrusion head. Moreover, the planes 17 and 18 of the end faces of the mandrel and the die need not be coplanar but could lie in planes parallel to one another and spaced a small distance apart.

It should also be appreciated that the extrusion head according to the present invention could be used equally well in rotatable blow molding machines having either horizontal or vertical axes or in non-rotatable machines in which one or more molds are moved along a straight or curved path.

Applicants have discovered that the results produced by devices according to the present invention can be still further improved by a careful selection of the direction of travel of the cutter during the tube cutting operation. Specifically, it has been found to be preferable to make this cut by moving the cutter upwardly in the direction of travel of the blow molds, or from left to right in the view of FIG. 7.

In addition, the direction of travel of the cutter should be parallel to the line of greatest inclination lying in the plane defined by end faces 17 and 18, i.e., parallel to that line which lies in the oblique plane and which forms the largest angle with a plane perpendicular to the longitudinal axis of the extrusion head. It has been found that a cut effectuated in this manner helps to maintain the upper end of the resulting parison open and, as a result, to facilitate the subsequent proper introduction of the air delivery tube for the subsequent blow molding operation.

FIG. 8 illustrates the preferred manner of cutting the tube 1 into a plurality of parisons 6. After the end of the tube emerging from the extrusion head has been fed into the mold 4 so that the bottom of the tube is deformed by the mold in the manner illustrated, the tube is cut at a point near the end face of the extrusion mold by a cutting blade traveling along a path from the position 5 to the position 5', this path being approximately parallel to the line of greatest inclination lying in the plane defining the end face of mandrel 3'. The mold 4 moves with its cut parison in the direction B to a blowing means 60 for performing the blow molding operation. The extrusion head, composed of die 2' and mandrel 3', is shown mounted on an extruder 61. Extrusion head, extruder 61 and blowing means 60 together comprise a machine for molding hollow bodies by blow molding.

FIG. 8a shows the velocity vector $v$ of the movement of the cutting blade in FIG. 8. It will be seen that the direction of movement has a component $v_0$ opposite to the direction A of travel of the tube emerging from the head.

As has been noted above, the direction in which the cutter moves during the cutting operation is very important and should be so chosen as to cause the cutter to travel in the same general direction as the mold 4. This causes the flexing which will inevitably occur in the tube 1 as it is being cut and as the mold is traveling in the direction of the arrow B to aid the cutting operation by increasing the separation between the cut surfaces as the cutting operation progresses.

According to another feature of the present invention, the cutting blade can be given a periodic reciprocating movement and can be shifted to one side of the extrusion head as the cutter moves downwardly along its return travel path.

One embodiment of such a cutter control device according the present invention is shown in FIG. 9. The cutter assembly is attached by means of a support 22 in the form of a fork to the end face of an extrusion head 23 constructed according to the present invention. On this support is mounted the reciprocating drive device 24 for the cutter blade 29. The fork 22 is mounted on the end face of the extrusion head die so as to lie in a plane parallel to the oblique cutting plane to be followed by blade 29.

Drive device 24 is rigidly connected to a shaft 25 which is also connected to a guide 26 arranged for movement in guideways formed in guide pieces 27 and 28. Cutter 29 is mounted on a support 30 which terminates in a guide pin 31 arranged to slide along a slideway 32 provided in guide 26 as well as in the guide channels 33 and 34 formed in the member carrying guide pieces 27 and 28.

A compression spring 35 is disposed around support 30 and acts to urge blade 29 and guide 26 into the position shown in FIG. 9.

The device further includes an elastic biasing member 36 which is disposed across guide channel 33 so as to permit the pin 31 to move to the right to the end of this guide channel, while preventing the pin from re-entering guide channel 33 once it has bypassed the member 36.

This device functions in the following manner: At the beginning of a cutting cycle, the blade 29 is in the position shown. When the extruded tube, indicated by the small dot-dash circles, has reached the desired length, the control device 24 is activated to move the shaft 25 to the right so as to draw the guide 26, the support 30 and the blade 29 to the right. During this travel, the pin 31 is guided in channel 33 so as to cause the upper tip of blade 29 to follow the path $a$–$b$ parallel to the line of greatest inclination represented by arrow S and to cut the tube. By the time the blade 29 reaches the point $b$, the pin 31 has moved past the member 36 and the latter returns to the position shown in FIG. 9.

For the return travel of the blade 29, drive means 24 moves its shaft 25 to the left, the pin 31 riding along biasing member 36 and then moving along guide channel 34. This causes the pin to also move downwardly in the slideway 32 and to draw the blade 29 downwardly. In this manner, as the blade moves along its return travel path $c$–$d$, it is shifted so as to bypass the plastic tube then emerging from the extrusion head. When the guide 26 reaches the end of the return travel path, the pin 31 clears the guide channel 34 so that the spring 30 is permitted to urge both the pin 31 and the blade 29 upwardly into the position shown in FIG. 9, the device then being ready for the next cutting cycle.

Figure 10:
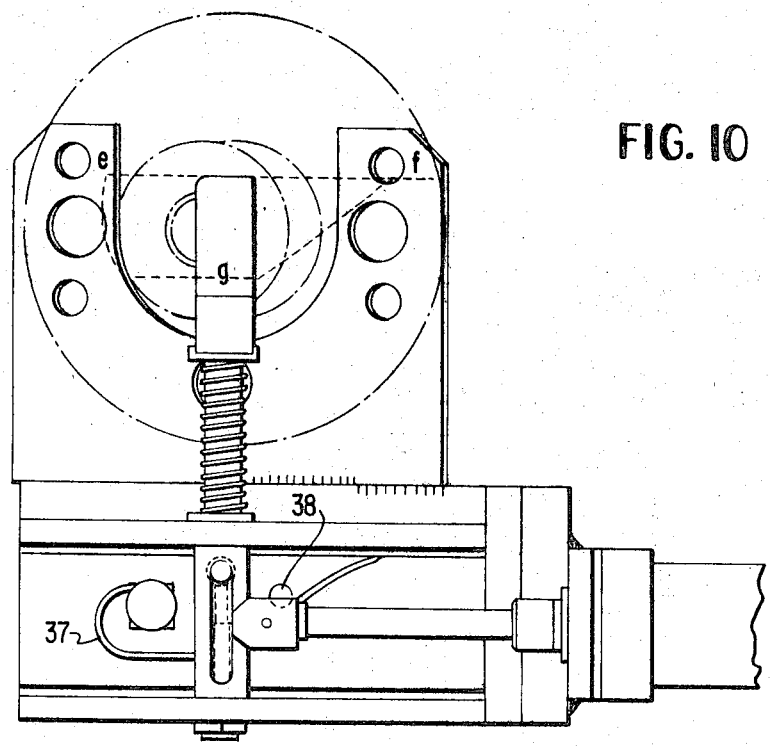
FIG. 10 is a view similar to that of FIG. 9 of a modified cutter control device according to the present invention.

FIG. 10 shows a similar control device with the cutting blade in a position midway between the ends of its travel path. In this embodiment, the guide channels and biasing member of the device of FIG. 9 are replaced by a single flexible blade 37 having a suitable configuration, which is maintained by an abutment 38. The mode of operation of this device is the same as that shown in FIG. 9, with the upper extremity of the cutting blade following the path $e$–$f$ during its cutting movement and the path $f$–$g$–$e$ during its return travel.

Figure 11:
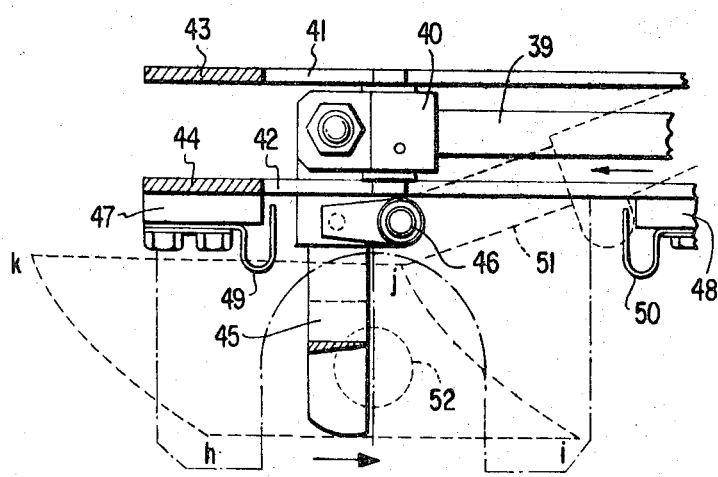
FIG. 11 is a view similar to that of FIG. 9 of another cutter control device according to the present invention.

FIG. 11 shows another embodiment of the cutting assembly according to the present invention in which the lateral displacement of the cutting blade during its return travel is achieved by a pivoting movement.

The arrangement shown in FIG. 11 includes a drive shaft 39 rigidly connected to a drive device (not shown) and connected to a guide 40 which is arranged to slide in slots 41 and 42 formed in guide pieces 43 and 44, respectively. The cutter 45 is mounted on a guide 40 in such a manner as to be capable of pivoting about its point of connection to the guide. In addition, a roller 46 is attached to the base of the blade of cutter 45 at some distance from the pivot of the cutter and the device is completed by abutments 47 and 48 equipped with shock absorbing springs 49 and 50, respectively.

This device operates in the following manner: The cutting blade is shown in its cutting position and is arranged to cut the plastic tube 52 as the shaft 39 moves to the right, with the extremity of blade 45 following the path $h$–$i$. When the blade 45 reaches the end of its cutting travel path, roller 46 encounters abutment 48 so that the assembly of the blade 45 and roller 46 is caused to pivot into the position 51 shown in broken lines. During this pivoting movement, the tip of the blade moves along the path $i$–$j$. Then, during the return travel of the shaft 39, the blade and roller are moved to the left, with the blade tip following the path $j$–$k$ and the blade thus bypassing the tube 52 then emerging from the extrusion head. At the end of the return travel path the blade tip reaches the point $k$ and the roller 46 encounters abutment 47, thus causing the blade to be pivoted back into its cutting position, the blade tip then arriving at the point $h$ and the assembly being ready for the next cutting cycle.

The blade could be maintained in the cutting position by any suitable detent means capable of resisting any force to which the blade might be subjected by the cutting operation but not sufficient to resist the pivoting force to which the blade is subjected when roller 46 is urged against abutment 48. A similar detent may be employed to maintain the blade in the position 51 until the roller encounters abutment 47.

Conventional features, where their detailed illustration is not essential for a proper understanding of the invention, have been illustrated in the drawings in the form of labelled boxes.

It will be understood that the above description of the present invention is susceptible to various modifications, changes and adaptations, and the same are intended to be comprehended within the meaning and range of equivalents of the appended claims.

What is claimed is:

1. In a device for extruding a straight hollow tube, which device includes an extrusion head, the improvement wherein said extrusion head comprises:
   (a) an internal mandrel whose end face lies in a plane oblique to the longitudinal axis of said head; and
   (b) an external die disposed around said mandrel and defining a tube-forming channel therewith, that die surface which defines the outer boundary of this channel terminating at a plane perpendicular to the longitudinal axis of said head;
the plane in which said mandrel end face lies having a line of greatest inclination, and wherein said device further comprises: a cutter for cutting the tube into parisons as the tube emerges in a continuous manner from said extrusion head; and cutter control means associated with said cutter for driving it in a direction having a component opposite to the direction of travel of the tube emerging from said head and along an oblique path parallel to said line of greatest inclination of the plane in which said mandrel end face lies.

2. An arrangement as defined in claim 1 wherein said cutter control means impart a reciprocating movement to said cutter, which movement has a forward cutting portion and a backward return portion, said control means including cutter shifting means for causing said cutter to bypass the tube emerging from said head during the return portion of its movement.

3. An arrangement as defined in claim 2 wherein said cutter control means include a mechanism having guide paths for controlling the displacement of said cutter.

4. An arrangement as defined in claim 3 wherein said mechanism has at least two guide paths, one of which guides said cutter during the forward portion of its movement and the other of which guides said cutter during the return portion thereof.

5. An arrangement as defined in claim 2 wherein said cutter shifting means are arranged for pivoting said cutter during the return portion of its movement.

6. In a device for extruding a straight hollow tube, which device includes an extrusion head, the improvement wherein said extrusion head comprises:
   (a) an internal mandrel whose end face lies in a plane oblique to the longitudinal axis of said head; and
   (b) an external die disposed around said mandrel and defining a tube-forming channel therewith, that die surface which defines the outer boundary of this channel terminating at a plane perpendicular to the longitudinal axis of said head;
and wherein said device further comprises a cutter for cutting the tube into parisons as the tube emerges in a continuous manner from said extrusion head; and a cutter control means associated with said cutter for driving it along a path parallel to the plane in which said mandrel end face lies.

7. An arrangement as defined in claim 6, wherein said cutter control means is also a means for driving said cutter in a direction having a component opposite to the direction of travel of the tube emerging from said head.

References Cited

UNITED STATES PATENTS

| | | | |
|---|---|---|---|
| 3,308,509 | 3/1967 | Hsia | 18—14G |
| 3,382,539 | 5/1968 | Zehr | 18—14G |
| 2,783,503 | 3/1957 | Sherman | 18—5BTU |
| 3,263,544 | 8/1966 | Margolien | 83—581X |
| 3,287,482 | 11/1966 | Wnek et al. | 18—5BTX |
| 3,369,273 | 2/1968 | Moran | 18—5BVX |

FOREIGN PATENTS

| | | | |
|---|---|---|---|
| 727,710 | 10/1942 | Germany | 83—160 |

CHARLES W. LANHAM, Primary Examiner

M. O. SUTTON, Assistant Examiner

U.S. Cl. X.R.

18—5